United States Patent
Meyer et al.

(10) Patent No.: US 9,419,316 B2
(45) Date of Patent: Aug. 16, 2016

(54) APPARATUS AND METHOD FOR MANUFACTURING A MODULAR BATTERY PACK WITH FLUID CIRCULATION TUBE AND INTERLEAVED FINS

(71) Applicant: Ford Global Technologies, LLC, Dearborn, MI (US)

(72) Inventors: Robert Hornblower Meyer, West Bloomfield, MI (US); Robert Alex Mitchell, West Bloomfield, MI (US); Neil Robert Burrows, West Bloomfield, MI (US); Valerie Jean Allan, Dearborn, MI (US); Jeffrey Paul Luther, Saline, MI (US); Michael Thomas Kramer, Grosse Pointe, MI (US); Patrick Michael Brennan, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/063,645

(22) Filed: Mar. 8, 2016

(65) Prior Publication Data
US 2016/0190665 A1    Jun. 30, 2016

Related U.S. Application Data

(62) Division of application No. 13/430,956, filed on Mar. 27, 2012, now Pat. No. 9,312,582.

(51) Int. Cl.
| | |
|---|---|
| H01M 10/6567 | (2014.01) |
| H01M 10/6551 | (2014.01) |
| H01M 10/625 | (2014.01) |
| H01M 10/613 | (2014.01) |
| H01M 10/04 | (2006.01) |

(52) U.S. Cl.
CPC ...... *H01M 10/6567* (2015.04); *H01M 10/0413* (2013.01); *H01M 10/613* (2015.04); *H01M 10/625* (2015.04); *H01M 10/6551* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 5,927,396 | A | 7/1999 | Damsohn et al. |
| 9,050,898 | B2 | 6/2015 | Syed et al. |
| 2005/0089750 | A1 | 4/2005 | Ng et al. |
| 2008/0305388 | A1 | 12/2008 | Haussman |
| 2010/0009248 | A1 | 1/2010 | Fuhrmann et al. |
| 2011/0076540 | A1 | 3/2011 | Ronning et al. |
| 2011/0162820 | A1 | 7/2011 | Weber et al. |

*Primary Examiner* — Sarah A Slifka
(74) *Attorney, Agent, or Firm* — David B. Kelley; Brooks Kushman P.C.

(57) ABSTRACT

A battery pack includes at least one serpentine fluid circulation tube that extends around part of the periphery of a plurality of electric cells. First and second segments of the tube are disposed adjacent a first and a second edge of a first set of the plurality of electric cells. The sets of electric cells are disposed in an alternating arrangement. A first fin and a second fin are provided between each of the electric cells. The fins have a reverse turn wrapped around the segments of the tube. The fins have internal ends that are disposed between the electric cells and the tube segments. The battery pack may be assembled by folding the fins around the electric cells and the tube or by preforming folded sheets that define thermal fins and assembling the folded sheets over segments of the tube from opposite sides of the electric cells.

14 Claims, 5 Drawing Sheets

APPARATUS AND METHOD FOR MANUFACTURING A MODULAR BATTERY PACK WITH FLUID CIRCULATION TUBE AND INTERLEAVED FINS

CROSS-REFERENCE TO RELATED APPLICATIONS

This application is a division of U.S. application Ser. No. 13/630,956 filed Mar. 27, 2012, the disclosure of which is hereby incorporated in its entirety by reference herein.

TECHNICAL FIELD

This disclosure relates to a method of manufacturing a modular battery pack with a plurality of electric cells, fins and tubes to provide a closed loop temperature control system for the battery pack.

BACKGROUND

Batteries for vehicles that have an electrically powered traction motor generally are not provided with a temperature control system for optimum charging and for providing maximum usable energy. Some batteries are air cooled and rely upon air flowing through passages or ducts that are adjacent to the electric cells of the battery. Air cooled systems are difficult to control because variations in ambient temperature impact the ability of such systems to control the temperature of the air provided to the battery. Air cooled batteries are difficult to package compactly while providing efficient temperature control.

Closed loop liquid temperature control systems for batteries offer the potential of more efficient and compact temperature control systems. One challenge associated with providing a liquid temperature control system is the cost to manufacture such a system. Another challenge is that it is difficult to provide an effective way to evenly control the temperature across individual electric cells throughout the battery pack.

The manufacturing method and apparatus disclosed herein is directed to solving the above problems and answering the challenges associated with providing closed loop temperature control systems for vehicle battery packs.

SUMMARY

According to one aspect of this disclosure, a battery assembly is provided that is wrapped by a fluid circulating cooling system. A plurality of electric cells each have an outer edge on at least one side. A serpentine fluid tube is disposed adjacent the outer edge of a first set of electric cells. A first fin and a second fin are disposed between each of the electric cells. The first fin has a first reverse turn wrapped around an outer portion of the fluid tube that is on the opposite side of the fluid tube from the outer edge of the electric cells. The second fin has a second reverse turn that is disposed between the fluid tube and each of the first set of electric cells.

According to other aspects of the disclosure, the serpentine fluid tube of the battery assembly may further comprise a plurality of first segments that are disposed adjacent a first outer edge of a first set of the plurality of electric cells and a plurality of second segments that are disposed adjacent a second outer edge of a second set of the plurality of electric cells. The first and second sets of electric cells may be disposed in an alternating arrangement with the first and second outer edges being disposed on opposite edges of the electric cells. The first fin may have a first reverse turn wrapped around the outer portion of the first segments. The second fin may have a second reverse turn wrapped around the outer portion of the second segments. The second fin may have a first internal end that is disposed between the electric cells and the first segments and the first fin may have a second internal end that is disposed between the electric cells and the second segments.

According to other aspects of the disclosure, the battery assembly may further comprise a thermal compound provided between the first fin, the first segments and the first internal end. The thermal compound may also be provided between the second fin, the second segments and the second internal end.

The first fin may be continuous and may extend from between a first cell and a second cell that is adjacent the first cell, around the first segments and between the second cell and a third cell that is adjacent the second cell to the second internal end. The second fin may be continuous and may extend from between a first cell and a second cell that is adjacent the first cell, around the second segments and between the second cell and a third cell that is adjacent the second cell to the first internal end.

According to an alternative embodiment, a battery assembly is disclosed that includes a fluid circulating cooling system that is assembled to a plurality of electric cells. The plurality of electric cells each have a first outer edge on a first side and a second outer edge on a second side that is oppositely oriented relative to the first side. At least one serpentine fluid tube that may be disposed adjacent the first edge of a first set of electric cells and the second edge of the second set of electric cells. A plurality of folded sheets each includes a first fin and a second fin that are joined by a reversely turned portion. A first set of the folded sheets are assembled over the fluid tube and the first edge of the first set of electric cells and a second set of the folded sheets are assembled over the fluid tube and the second edge of the second set of electric cells. The first fins and the second fins of the first and second sets of folded sheets are interleaved between the electric cells and each other.

According to other aspects of this embodiment, the first set of folded sheets are U-shaped in cross-section. The first leaf and a second leaf extend from the reverse turn of the first set of folded sheets in a spaced relationship. The second set of folded sheets are U-shaped in cross-section. The first and second leaf extend from the reverse turn of the second set of folded sheets in a spaced relationship. The first and second leafs of the first set of folded sheets are each inserted between a cell and one of the first and second leafs of the second set of folded sheets. The first and second leafs of the first set of folded sheets may each extend to a first internal end and the first and second leaf of the second set of folded sheets may each extend to a second internal end. The first and second leafs of the first set of folded sheets may form a seam at the first internal end and the first and second leafs of the second set of folded sheets may form a seam at the second internal end.

According to other aspects of this embodiment of the battery assembly, the first fin may have a first surface feature that limits movement of one of the electric cells toward the second internal end and the second fin may have a second surface feature that limits movement of another one of the electric cells toward the first internal end. The first and second retaining surface features may be indentations that engage an outer peripheral edge of the cell. The battery assembly may further include a first electrically insulating layer provided between the electric cells and the first and second fins to electrically insulate the electric cells from the first and second fins.

The battery assembly includes a liquid that is circulated from a fluid circulation system through the fluid tube and back to the fluid circulation system.

According to another aspect of the disclosure a fan fold method of manufacturing a battery for an electric vehicle is disclosed wherein a first and a second fin are folded in a fan fold arrangement with a plurality of parallel fins that are joined at a plurality of reversely turned ends. A plurality of electric cells are wrapped with the first and second fins with one cell being disposed between two adjacent parallel fins. A fluid tube is assembled between the first and second fins at the reversely turned ends.

According to other aspects of the fan fold method, the step of assembling the fluid tube may further comprise wrapping the first fin about the fluid tube on an first reversely turned end and overlapping an outer side of the second fin that encloses one of the electric cells on an inner side of the second fin. The step of assembling the fluid tube may further comprise wrapping the second fin about the fluid tube on a second reversely turned end and overlapping an outer side of the first fin that encloses another one of the electric cells on an inner side of the first fin.

According to another aspect of the disclosure, an interleaving assembly method of manufacturing a battery is provided. A plurality of electric cells and a serpentine fluid tube are provided that has a plurality of first segments that extend along an first edge of some the electric cells and a plurality of second segments that extend along a second edge of some of the electric cells. A plurality of U-shaped members having two leafs that are joined by a reversely turned portion are assembled each to one of the segments of the fluid tube with each leaf being inserted between two adjacent electric cells.

According to other aspects of the interleaving assembly method, the plurality of U-shaped members may further comprise a plurality of first U-shaped members and a plurality of second U-shaped members. The assembling step may further comprise assembling the first U-shaped members to the first segments of the fluid tube and assembling the second U-shaped members to the second segments of the fluid tube. The step of assembling the plurality of U-shaped members may further comprise assembling the first U-shaped members over a cell and a leaf of two adjacent second U-shaped members and assembling the second U-shaped members over an adjacent cell and a leaf of two adjacent first U-shaped members.

According to a further aspect of the disclosure, a battery assembly is sequentially cooled by a fluid circulating cooling system. The battery system comprises a plurality of stacked electric cells that are arranged in a stacking direction. Each electric cell has a first outer edge and a second outer edge on an opposite sides of the electric cells. At least one fluid circulation tube receives a fluid from a supply port, circulates the fluid about the electric cells in a sequence, and drains the fluid into a drain port. The fluid circulation tube includes a first set of segments that each contact one of the outer edges of the electric cell. The fluid transfers thermal energy from the electric cells sequentially as the fluid flows through a first set of segments in the stacking direction and as the fluid flows through a second set of segments counter to the stacking direction.

According to other aspects of the disclosure relating to the transfer of thermal energy in sequence, the at least one fluid circulation tube may include one fluid circulation tube, wherein the first set of segments contacts the first outer edges and the second set of segments contacts the second outer edges. Alternatively, the at least one fluid circulation tube may include a first fluid circulation tube that includes the first set of segments that contact the first outer edges and a second fluid circulation tube that includes the second set of segments that contact the second outer edges.

The above aspects and other aspects of the disclosure will be better understood in view of the attached drawings and the following detailed description of the illustrated embodiments.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
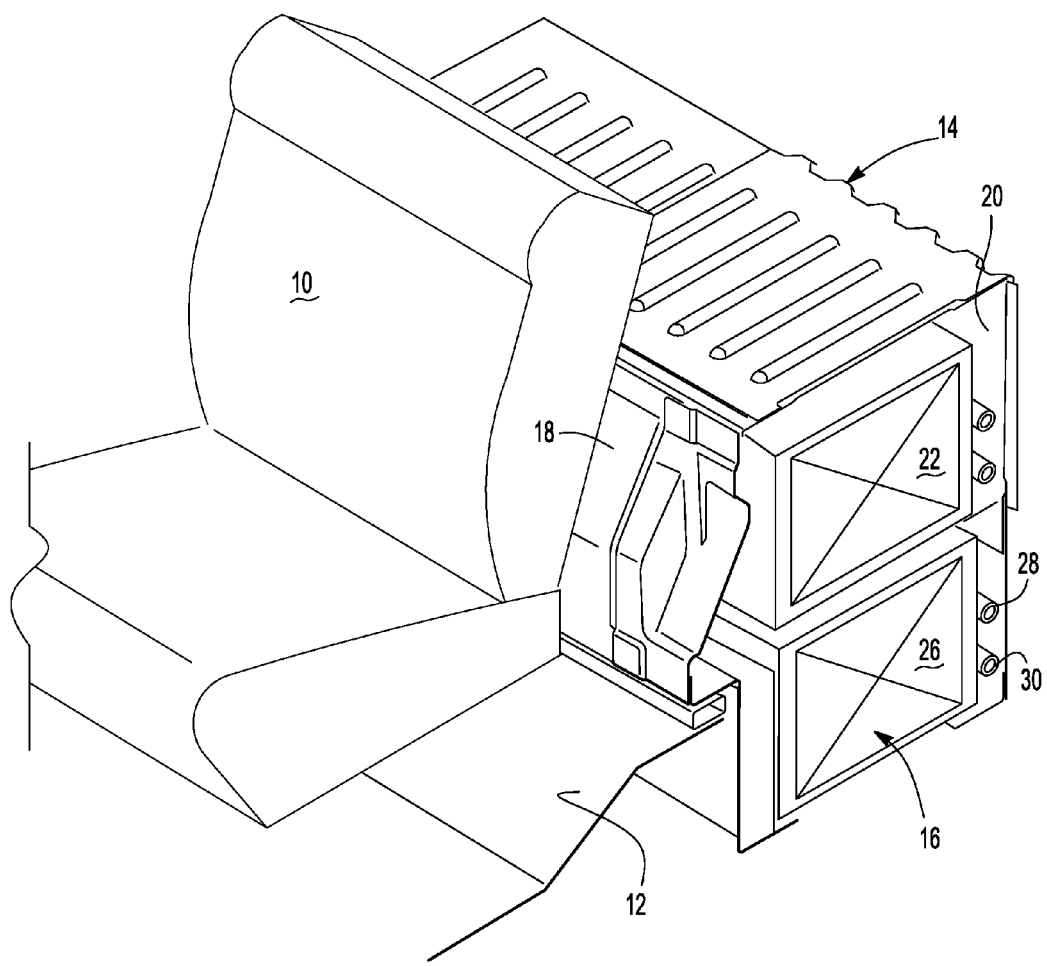
FIG. 1 is a fragmentary perspective view of the rear seat in a vehicle and a battery module in a battery storage compartment.

Referring to FIG. 1, a seat 10 for a vehicle 12 is shown in conjunction with a battery assembly 14 of a battery electric vehicle (BEV) or hybrid electric vehicle (HEV). The battery assembly 14 is disposed in a battery compartment 16 located behind the seat 10 of the vehicle 12. The seat 10 is the rearmost seat of a vehicle which in a vehicle with a single row of seats could be the front seat. The battery compartment 16 of the vehicle 12 is separated from the passengers and seat area by a rear wall 18. The battery assembly 14 includes an enclosure 20 that encloses a first, or upper, battery stack 22 and a second, or lower, battery stack 26. It should be understood that a single battery stack could be provided instead of providing a first battery stack 22 and second battery stack 26. The battery assembly 14 could also be differently oriented in a side-by-side orientation. A fluid supply pipe 28 provides fluid, preferably a liquid coolant, which is circulated through the battery assembly 14 to a fluid return pipe 30.

As used throughout the specification and claims of this disclosure, the terms "upper" and "lower" are used with reference to the illustrated embodiments. It should be understood that the battery assembly may be installed in a vehicle with the assembly at an angle, for example, with the upper portions in front of the lower portions or in any other angular orientation. Generally, the upper and lower portions of a part or assembly of parts are on opposite sides of the part.

Figure 2:
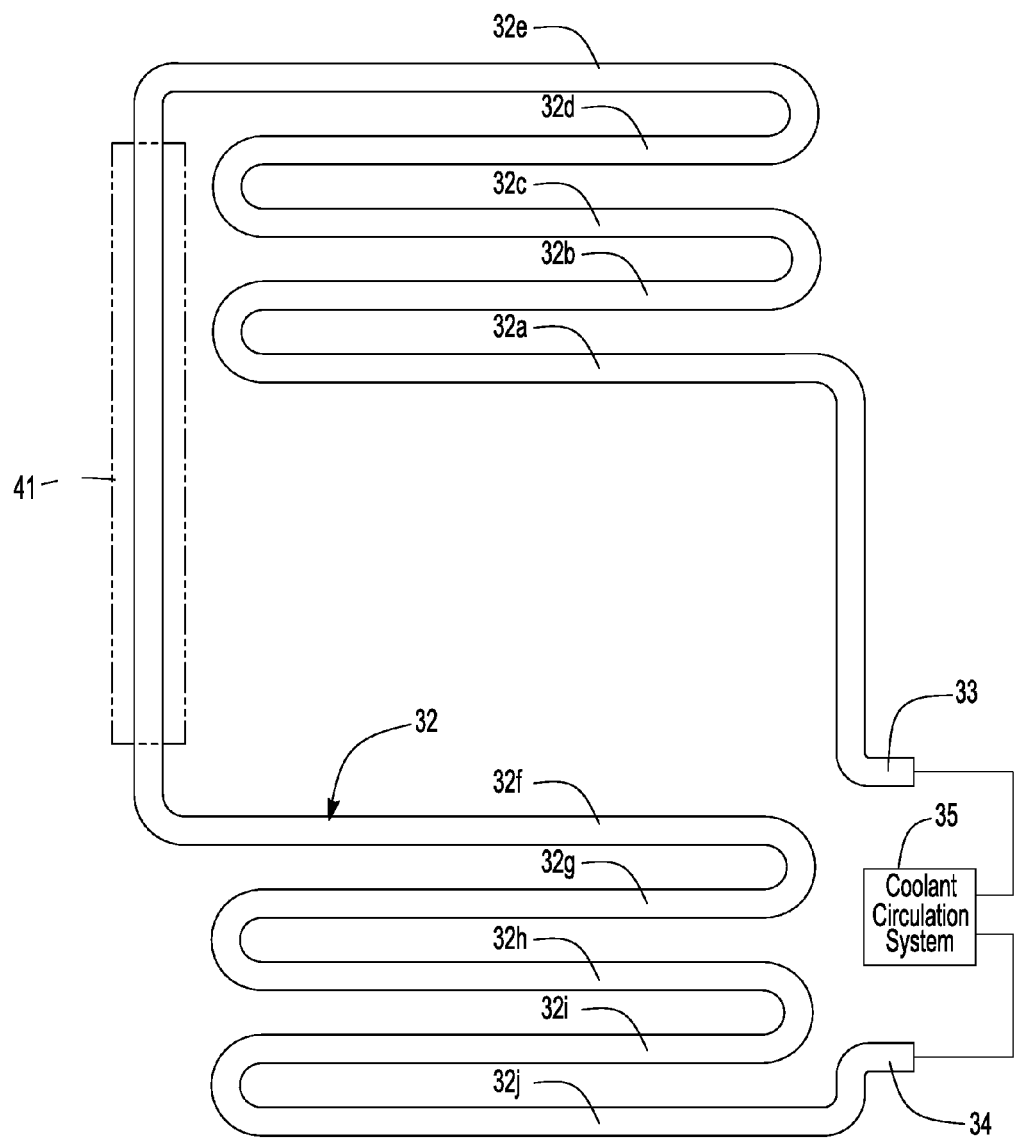
FIG. 2 is a diagrammatic view of a fluid circulation tube that is routed across two opposite sides of the battery module and is in fluid flow communication with a fluid circulation system.

Referring to FIG. 2, a fluid circulation tube 32 is shown that directs liquid fluid around the battery assembly 14 (shown in FIG. 1) to cool the battery assembly 14. The fluid circulation tube 32 removes heat or may supply heat to the battery assembly 14, as needed for optimal battery operation, taking fluid from the fluid supply pipe 28 (shown in FIG. 1) and emptying the liquid into the fluid return pipe 30 (shown in FIG. 1). The fluid circulation tube 32 includes an inlet 33 and an outlet 34 that are connected to a fluid circulation system 35. Fluid is provided from the fluid circulation system 35 through the inlet 33 and then follows a serpentine path around the top and bottom of either of upper or lower of the battery stacks 22, 26 (as shown in FIG. 1). The fluid circulation tube 32 could also follow a serpentine path around the front and rear or left and right sides of the battery assembly 14.

In the illustrated embodiment, the fluid circulation tube 32 circulates a liquid coolant around a plurality of battery stacks 22, 26 (shown in FIG. 1) prior to being returned to the fluid return pipe 30. The fluid circulation tube 32 may pass around the top and bottom of a plurality of the electric cells 38 (shown in FIGS. 4 and 5). The temperature of the battery assembly 14 is balanced in the embodiment of FIG. 2 because the fluid circulating through the fluid circulation tube 32 is heated as it flows sequentially through the top segments 32a-32e and is continued to be heated as the fluid flows through the bottom segments 32f-32j. In a cooling mode, an electric cell 38 disposed between segments 32a and 32j is exposed to the coolest segment and warmest segment. An electric cell 38 disposed next to segments 32e and 32f is exposed to intermediate temperature segments. Thus the cooling effect is balanced across the module.

In the embodiment of FIG. 2, fewer joints are required for connecting the tube to the coolant supply system. The tube may include a hose 41 shown in dashed lines between the upper and lower sections of the tube.

Figure 3:
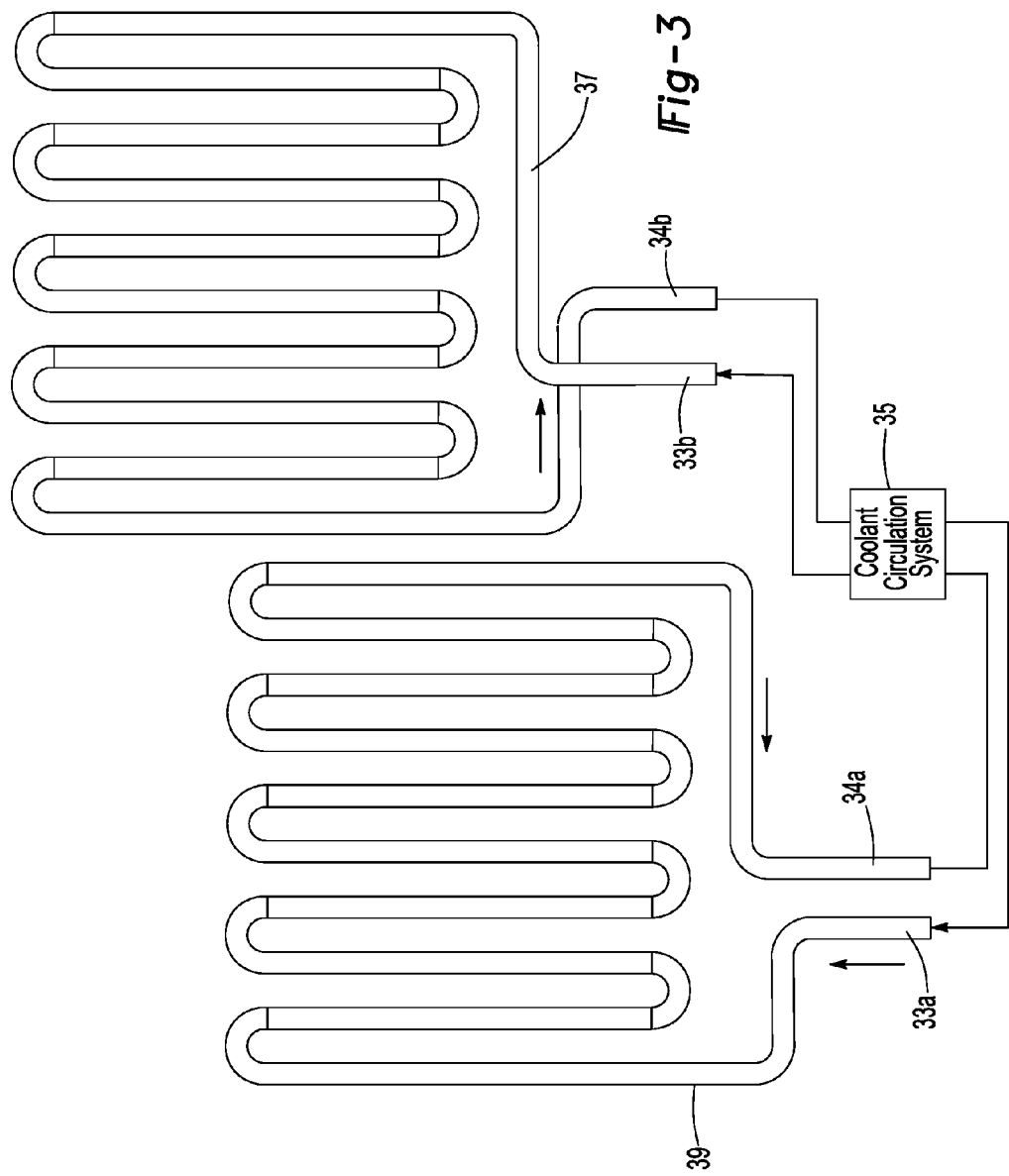
FIG. 3 is a diagrammatic view of two fluid circulation tubes that are each routed across one side of the battery module and are both in fluid flow communication with a fluid circulation system.

Referring to FIG. 3, another embodiment is shown that includes on one side, ie. a top side, a serpentine tubular member 37 and on the other side, ie. a lower side, a serpentine tubular member 39. Coolant is provided through inlets 33a and 33b to the tubular members 37 and 39, respectively, from the coolant circulation system 35. Coolant is returned to the coolant circulation system 35 through the outlets 34a and 34b, respectively. In this embodiment, coolant passes only around one side of the plurality of electric cells 38 (shown in FIGS. 4 and 5) in a serpentine fluid circulation tube 37 with a second fluid circulation tube 39 passing only around the other side of the plurality of electric cells 38 in a serpentine path. To balance the cooling across the module, the direction of fluid flow in the tubular member 37 is from left to right as shown in FIG. 3 and the fluid flow through the tubular member 39 is from right to left as shown in FIG. 3.

In the embodiment of either FIG. 2 or 3, the inversely symmetrical tube arrangement provides more uniform temperature in all of the cells of a module even though the coolant heats up as it flows through the tubular members.

Heat created when the electric cells 38 are charged, may be removed by the fluid in the fluid circulation tube 32 and transferred to a fluid circulation system 35. By removing heat from the electric cells 38 during charging, the battery assembly 14 may be charged more efficiently. Conversely, a cold battery may be heated by circulating warm fluid through the fluid circulation tube 32. More efficient discharge of the electric cells 38 may also be achieved by warming the battery assembly 14 to a preferred temperature range by circulating the warm fluid through the fluid circulation tube 32 and fluid circulation system 35.

Figure 4:
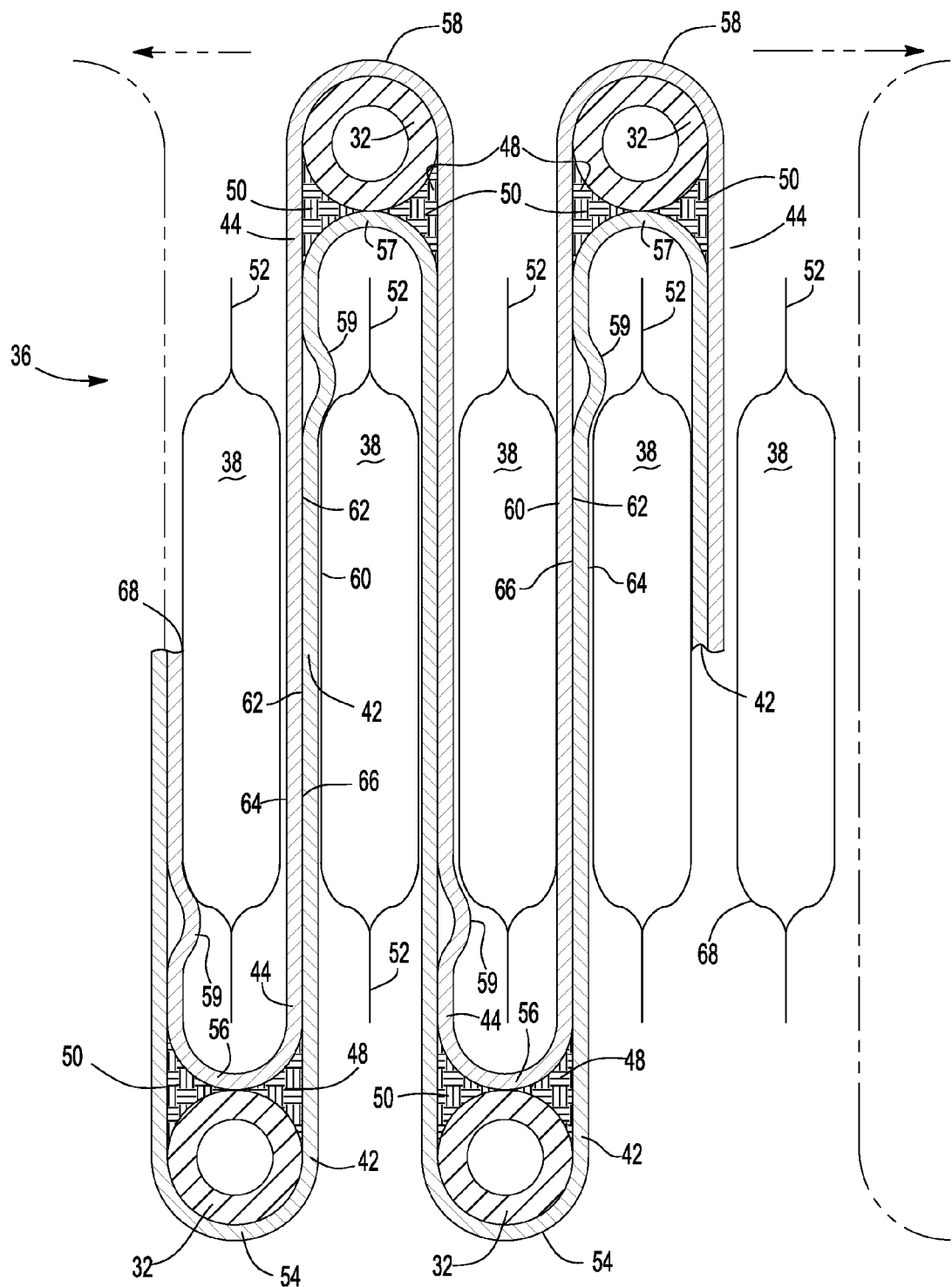
FIG. 4 is a fragmentary cross-sectional view of one embodiment of a battery assembly provided with a fluid circulation tube and a plurality of heat conducting fins and electric cells.

Referring to FIG. 4, one embodiment of a battery pack 36 is shown in which a plurality of electric cells 38 are wrapped between a first fin layer 42 and a second fin layer 44. A length of a fluid circulation tube 32 is received between the first and second fin layers 42 and 44. A void 48 is formed between the first fin layer 42, second fin layer 44 and the fluid circulation tube 32. The void 48 may be filled with a thermal compound 50. The electric cells 38 have a fin 52 formed about their outer periphery. The first fin layer 42 has an outer reverse turn 54 that is formed around and in close contact with the fluid circulation tube 32 in the portion of the battery pack at the bottom of FIG. 4, as illustrated. An inner reverse turn 56 is formed in the second fin layer 44. The inner reverse turn 56 is shown abutting the fluid circulation tube 32 and is also received within the first fin layer 42. The second fin layer 44 in the leftmost loop shown in FIG. 4 is shown to be in contact with one of the electric cells 38.

In the upper portion of FIG. 4, the orientation of the first and second fin layers 42 and 44 is reversed so that the second fin layer 44 extends around the outside of the fluid circulation tube 32 and encloses the first fin layer 42. The second fin layer 44 is formed into the outer reverse turn 58. The first fin layer 42 includes an inner reverse turn 57 that is shown to be in contact with the fluid circulation tube 32. The first fin layer 42 contacts the second electric cell 38 from the left as shown in FIG. 4.

The second fin layer 44 in the first loop on the left side of FIG. 4 includes an indented rib 59 that limits movement of the cell 38 toward the inner reverse turn 56. The first fin layer 42 and the second cell from the left in FIG. 4 includes an indented rib 59 that similarly restricts movement of the cell in the second cell from the left in FIG. 4.

A first surface 60 of the first fin layer 42 contacts one of the electric cells 38. A second surface 62 of the first fin layer 42 is provided on opposite side of the first fin layer 42 from the outer surface 60. Similarly, a first surface 64 of the second fin layer 44 contacts one of the electric cells 38 in an alternating fashion while the second surface 66 of the second fin layer 44 is in face-to-face contact with the second surface 62 of the first fin layer 42.

To prevent short circuiting through the fins, an electrically insulating layer 68 should be provided between the first surface 60 of the first fin layer 42 and between the first surface 64 of the second fin layer 44. The electrically insulating layer 68 may be incorporated as an outer covering of the electric cells 38. The electrically insulating layer, while not shown in FIG. 4, may alternatively be a thin layer of plastic or other insulating material that is provided in the areas identified by reference numeral 68 on both sides of the electric cells 38.

According to the process for continuous automated assembly, straight lengths of the tubular member 32 denoted 32a-j and the bent portions of the tube may be continuously formed as the fins are folded into position around the tube segments 32a-j. The electric cells 38 are placed in position as each layer of the tube 32 and fins 42 and 44 are formed into position. The fins 42 and 44 are folded into a tight fit with the tubular member 32 to facilitate heat transfer.

Figure 5:
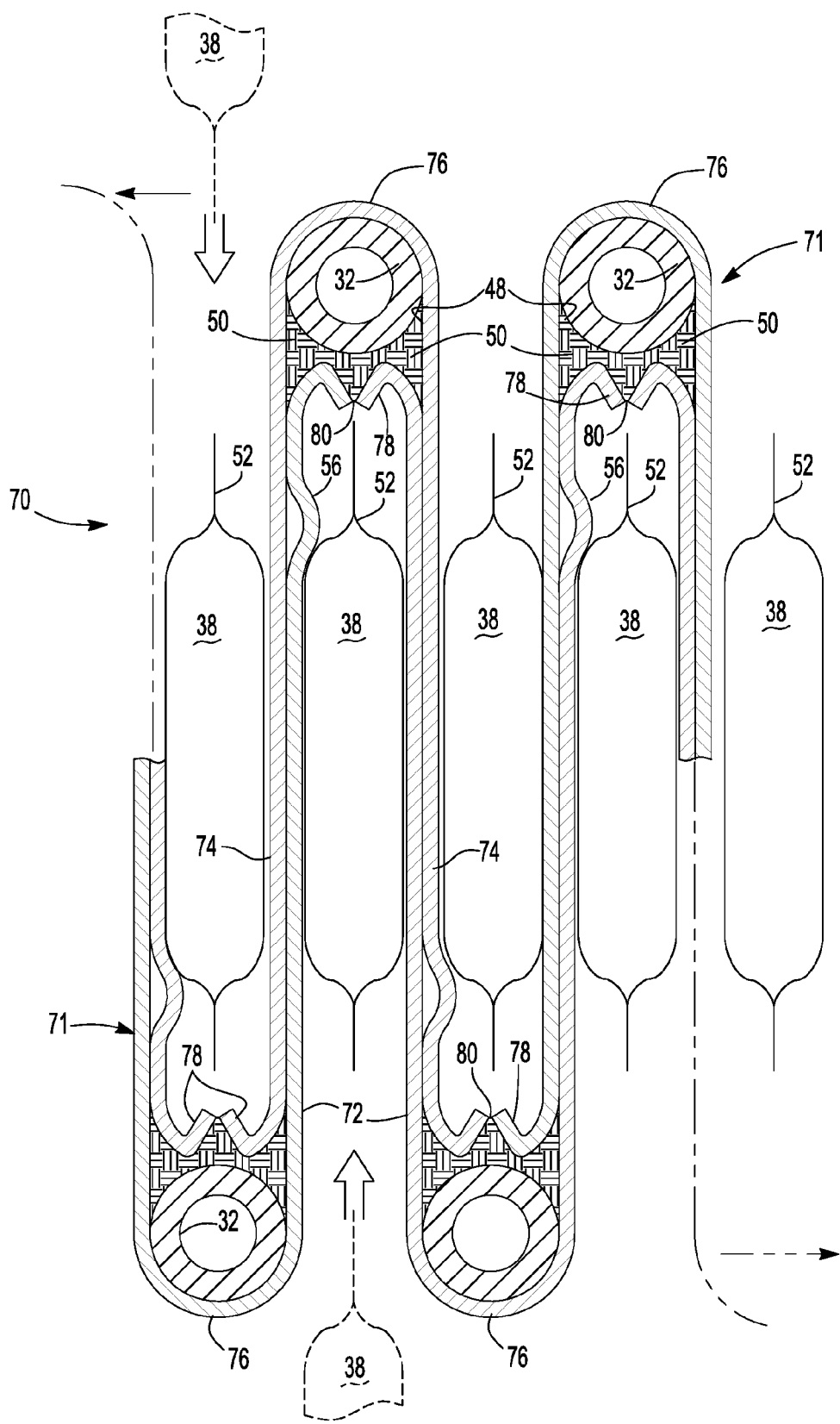
FIG. 5 is a fragmentary cross-sectional view of an alternative embodiment of a battery assembly provided with a fluid circulation tube and a plurality of heat conducting fins and electric cells.

Referring to FIG. 5, an alternative embodiment of the battery pack is generally indicated by reference numeral 70. In the description of FIG. 5, similar components to those shown in FIG. 4 are identified by the same reference numeral. A plurality of folded sheets 71 are simple pre-formed members that are interleaved with electric cells 38. A first thermal fin 72 and a second thermal fin 74 are assembled together as a dual leaf structure from opposite directions. The thermal fins 72 and 74 each include an intermediate bend 76 that is assembled to a length of the fluid circulation tube 32. An end flange 78 is provided on each of the planar fins 72 and 74. Two adjacent thermal fins 72 are inserted from the same side with one leaf of each fin 72 being received within one of the fins 74. One leaf of each fin 72 is inserted between the electric cells 38 and one leaf of the fin 74. A seam 80 is formed at the juncture of the end flanges 78. The electric cells 38 are captured between each pair of thermal fins 72 and 74 with the electric cells 38 being aligned with the seam 80. A void 48 is formed between the fluid circulation tube 32 and the end flanges 78 of the thermal fins 72 and 74. The fin design facilitates forming the fins 72 and 74 into a tight fit to facilitate heat transfer. The process for assembling the fins 72 and 74 to the electric cells 38 may be automated.

The battery pack 70 shown in FIG. 5 may be assembled by stacking a plurality of folded sheets 71 with the dual leaf planar thermal fins 72 and 74 being assembled from opposite sides. The dual leaf planar thermal fins 72 and 74 may be assembled with one leaf on each side of the fluid circulation tube 32 and on the outer side of the oppositely oriented planar leaf. The electric cells 38 disposed between adjacent thermal fins are inserted from the sides of the assembly as shown in phantom lines in FIG. 5. An electrically insulating layer (not shown in FIG. 5) may be provided (either on the electric cells 38 or fins 72 and 74) between the electric cells 38 and the dual leaf thermal fins 72 and 74 to prevent electrical contact between the thermal fins 72, 74 and the electric cells 38.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A battery cooling system comprising:
   a plurality of cells;
   first and second tubes disposed at opposite ends of the cells; and
   first and second fins disposed between the cells such that on a first battery side, the first fin is configured to wrap around alternating cell ends to encase the first tubes therebetween, and on a second battery side, the second fin is configured to wrap around respective second tubes and the first fin is configured to wrap around alternating cell ends.

2. The battery cooling system of claim 1, further comprising a thermal compound provided between the first fin, the first tubes and the cell ends, and provided between the second fin, the second tubes and the cell ends.

3. The battery cooling system of claim 1, wherein the plurality of cells further includes a second cell end not enclosed by either of the first and second fins.

4. The battery cooling system of claim 1, wherein the first fin is continuous and extends from between a first cell and a second cell that is adjacent the first cell, around one of the first tubes and between the second cell and a third cell that is adjacent the second cell.

5. The battery cooling system of claim 1, wherein the second fin is continuous and extends from between a first cell and a second cell that is adjacent the first cell, around one of the second tubes and between the second cell and a third cell that is adjacent the second cell.

6. A battery assembly comprising:
   a plurality of electric cells each having ends disposed in an alternating orientation;
   first and second tubes disposed adjacent the ends; and
   first and second fins configured to wrap around the ends in a serpentine manner such that on a first side, the first fin encases the first tube therebetween, and on a second side, the second fin wraps around respective second tubes and the first fin wraps around alternating ends.

7. The battery assembly of claim 6, wherein the first fins each extend to a first internal end and the second fins each extend to a second internal end.

8. The battery assembly of claim 7 wherein the first fins form a seam at the first internal end and the second fins form a seam at the second internal end.

9. The battery assembly of claim 7, wherein the first fin has a first surface feature that limits movement of one of the electric cells toward the second internal end and the second fin has a second surface feature that limits movement of another one of the electric cells toward the first internal end.

10. The battery assembly of claim 9, wherein the first and second surface features are indentations that engage an outer peripheral edge of the electric cell.

11. The battery assembly of claim 6, wherein a first electrically insulating layer is provided between the electric cells and the first and second fins to electrically insulate the electric cells from the first and second fins.

12. The battery assembly of claim 6, wherein a liquid is circulated from a fluid circulation system through the first and second tubes and back to the fluid circulation system.

13. A battery assembly comprising:
   a plurality of cells that are arranged in an opposite, alternating manner; and
   first and second fins, wherein the first fin wraps around a respective first tube and the second fin wraps around alternating cell ends to encase the first tube therebetween on a first battery side, and the second fin wraps around a respective second tube and the first fin wraps around alternating cell ends on a second battery side.

14. The battery assembly of claim 13, wherein the second fin is configured to wrap around alternating cell ends to encase the second tubes therebetween.

* * * * *